(No Model.) 4 Sheets—Sheet 1.
R. J. ROBERSON & C. F. MOORE.
COTTON HARVESTER.
No. 554,199. Patented Feb. 4, 1896.
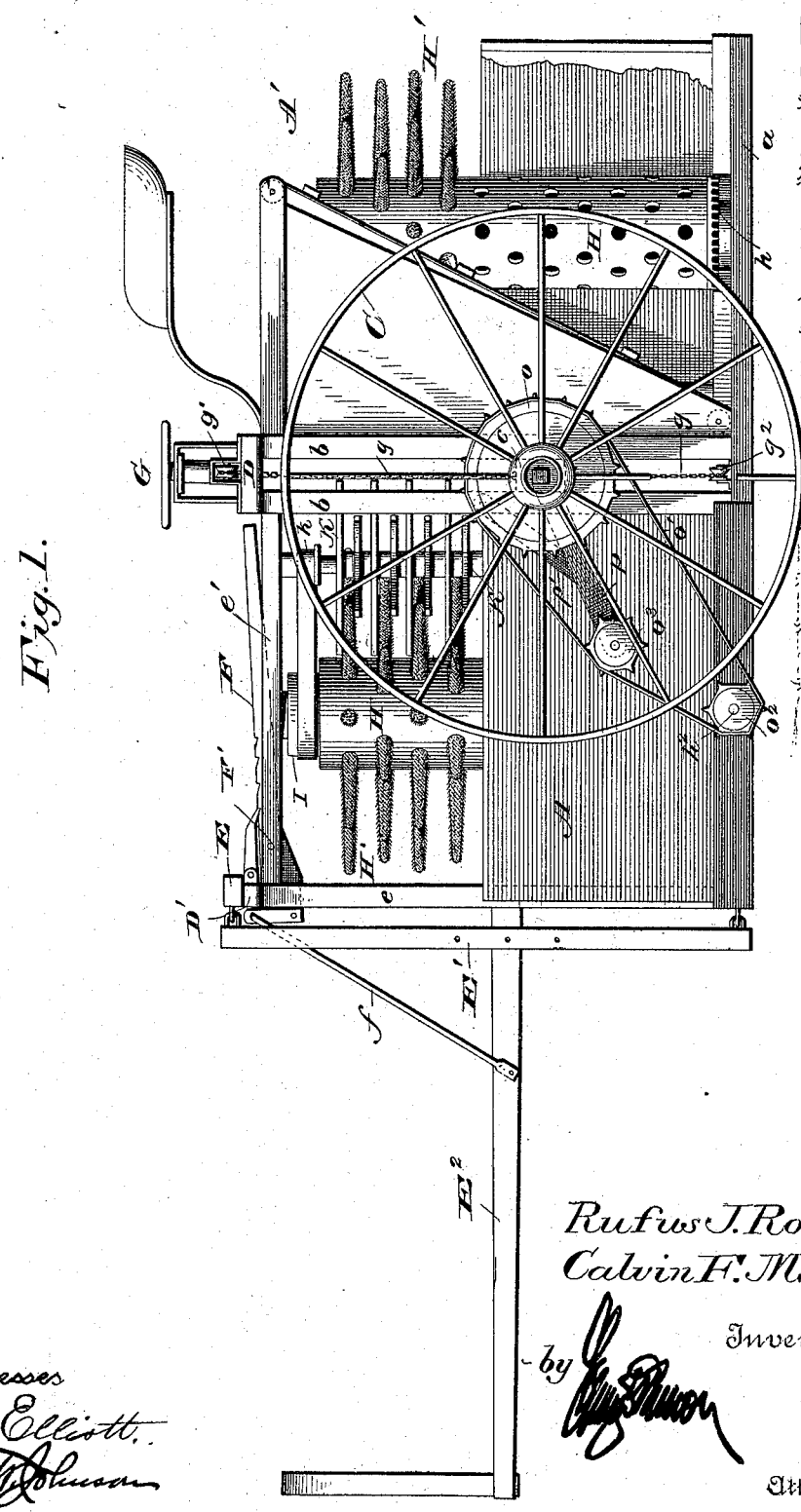
Fig. 1.
Witnesses
Rufus J. Roberson
Calvin F. Moore.
Inventors
Attorney (No Model.) 4 Sheets—Sheet 4.

R. J. ROBERSON & C. F. MOORE.
COTTON HARVESTER.

No. 554,199. Patented Feb. 4, 1896.

Witnesses
G. S. Elliott
E. W. Johnson

Rufus J. Roberson
and
Calvin F. Moore.
Inventors

Attorney

UNITED STATES PATENT OFFICE.

RUFUS J. ROBERSON AND CALVIN F. MOORE, OF RANSOM, ILLINOIS; SAID MOORE ASSIGNOR TO SAID ROBERSON.

COTTON-HARVESTER.

SPECIFICATION forming part of Letters Patent No. 554,199, dated February 4, 1896.

Application filed June 21, 1890. Renewed July 27, 1893. Serial No. 481,659. (No model.)

*To all whom it may concern:*

Be it known that we, RUFUS J. ROBERSON and CALVIN F. MOORE, citizens of the United States of America, residing at Ransom, in the county of La Salle and State of Illinois, have invented certain new and useful Improvements in Cotton-Harvesters; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to a machine for gathering cotton from the stalks; and it consists in the construction, combination and arrangement of the parts, as will be hereinafter fully set forth and particularly pointed out in the claims.

The object of the invention is to provide a cotton-harvester with means for gathering the staple from the plants upon picker-stems without injury to the plants, removing the cotton so gathered, depositing it in a receptacle and conveying it therefrom by means of endless belts to suitable bags or baskets, the gathering mechanism being supported by a frame, which is adapted to be raised and lowered to suit the different conditions of the growing plants, the draft mechanism also being adjustable to maintain the frame parallel with the ground.

The harvester in operation passes over the row of plants, and the supporting-wheels of the frame travel in spaces in each side of the row, the draft-animals being hitched in front of the frame, so that they may walk in the space between the rows.

The frame of the harvester is so constructed that one set of the gathering mechanism will be located on one side of the frame in front of the gathering mechanism on the opposite side thereof, so that the cotton growing on one side of the plant will be gathered before that growing on the opposite side, which is gathered by the rear picker-stems.

Figure 2:
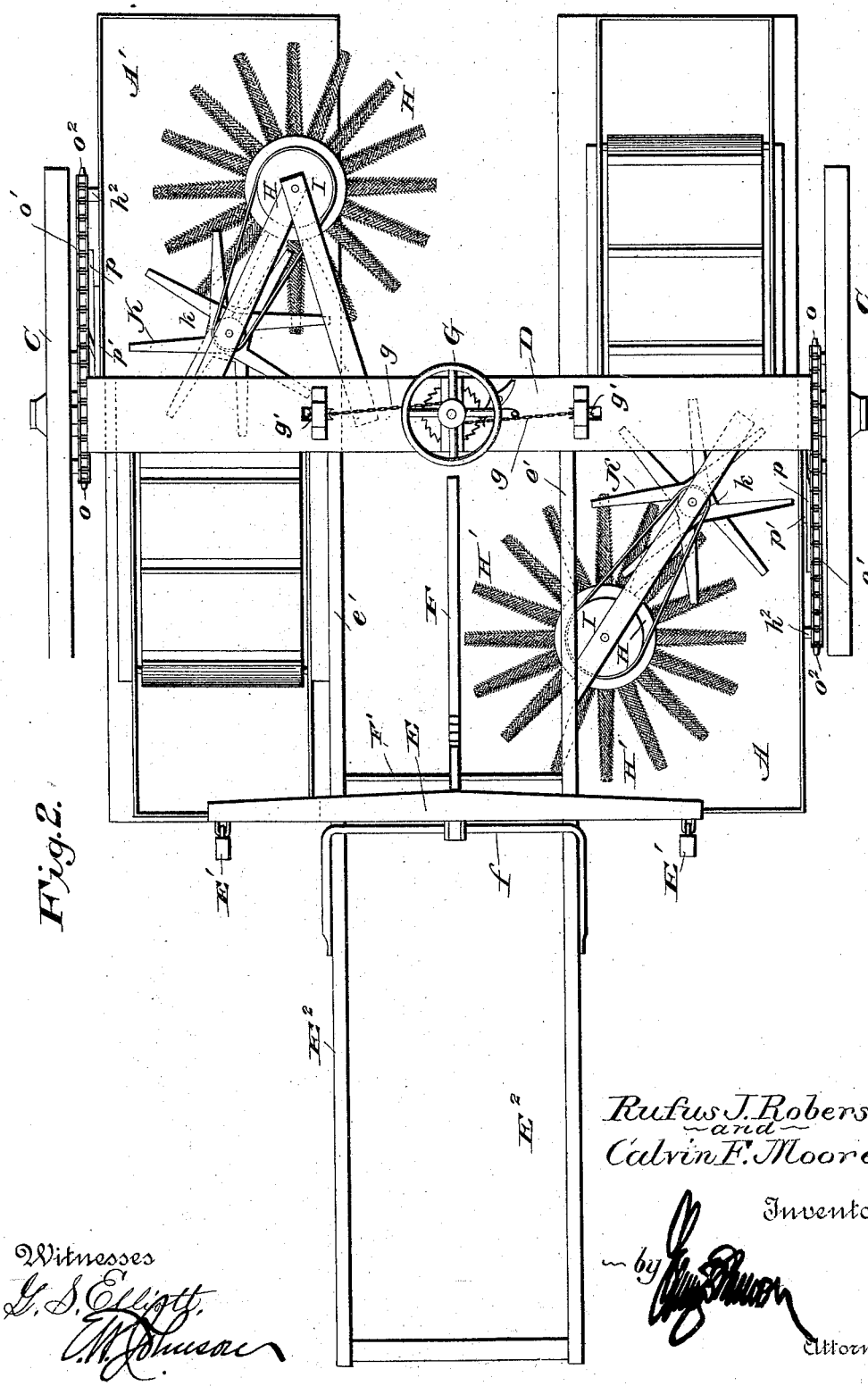
Figure 3:
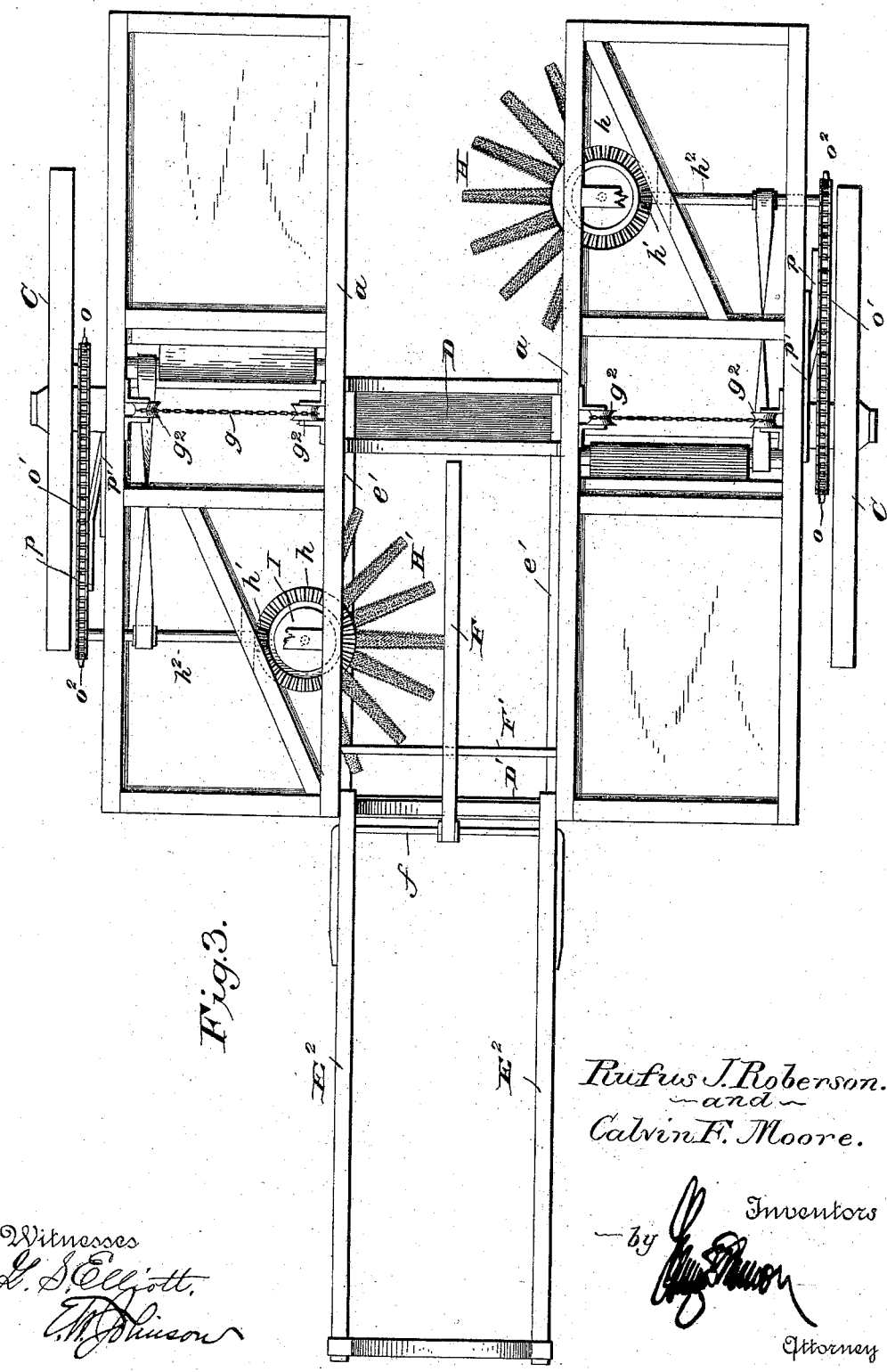
Figure 4:
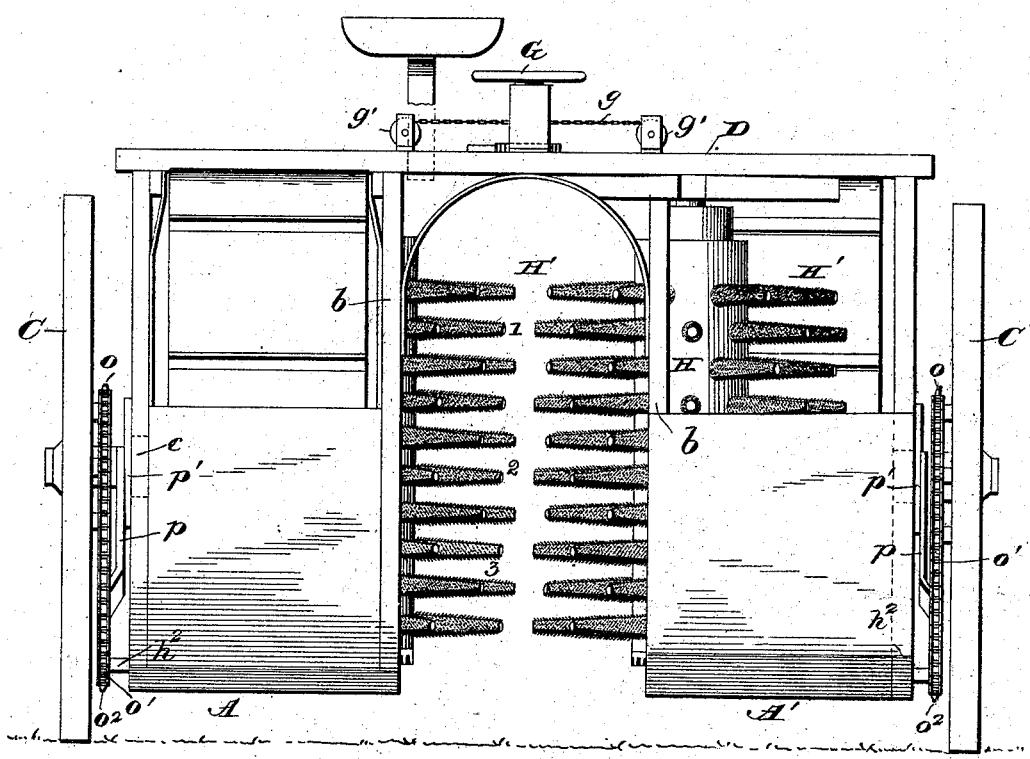
Figure 5:
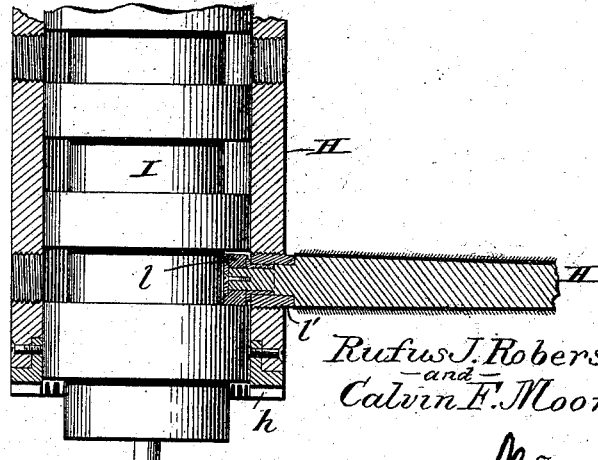

In the accompanying drawings, which illustrate a cotton-harvester constructed in accordance with our invention, Figure 1 is a side view, a part of one of the receptacles being broken away so as not to obscure one of the cylinders. Fig. 2 is a plan view. Fig. 3 is a bottom view; Fig. 4, a rear elevation. Fig. 5 is a sectional view of one of the cylinders which carries the pickers, showing a picker in position.

The frame is made up of sections A and A', which consist of parallel sill-pieces $a\,a$ connected to each other by cross-bars and diagonal beams. Centrally the rectangular base-frames, comprising the sills, cross-beams and diagonal braces hereinbefore referred to, are provided with upright parallel beams $b\,b$, the outer pairs of which support blocks $c$, having stub-axles upon which are journaled the supporting-wheels C, so that the frame can be adjusted upon said supporting-wheels by suitable mechanism. The blocks $c$, which carry the stub-axles upon which the supporting-wheels C are mounted, are provided with tongues, which lie in grooves formed in the parallel beams $b$, and to these blocks the flexible connections $g$ are secured by staples or other suitable fastening means. The parallel beams $b\,b$ are connected at their upper ends by a transverse beam D, which, with the forward transverse beam D', connects the two side frames A and A' to each other.

The front corner posts $e$ upon which the transverse beam D' is located is connected to the central transverse beam D by parallel pieces $e'$, and pivoted centrally upon the beam D' is a bar E, to the ends of which are loosely connected by means of eyes vertical bars E', which extend downwardly and are similarly connected to the front transverse beam of the base-frame. To these bars E' are attached the whiffletrees, which can be suitably adjusted thereon, while the neck-yokes are secured to the forward ends of the shafts or poles $E^2$, which are pivotally connected at their rear ends to the vertical posts $e$, their forward ends being connected by an arched yoke.

The shafts or poles $E^2$ are provided with a bail $f$, which extends upwardly and passes through the end of the crank-lever F, which is properly fulcrumed on a rod F', secured transversely in the frame, as shown in Figs. 2 and 3, the rear end of this lever extending within reach of the driver, who sits upon a seat supported by the cross-beam D. The lever F is held in position after being adjusted by a gravity-pawl, which engages with notches in the upper edge of the lever F. By providing the poles with this adjustment the draft mechanism can be so disposed that the frame will be supported parallel with the ground.

Centrally upon the transverse beam D is mounted a windlass G, consisting of a hand-wheel, drum and suitable ratchet-wheel, and over the drum passes flexible connections $g$, guided by pulleys or rollers $g'$ downwardly between the parallel and vertical beams $b\ b$ to suitable rollers or pulleys $g^2$, carried by the sill-pieces $a$, and thence upwardly to the sliding blocks $c$, which travel between the vertical uprights $b\ b$ and support the carrying and driving wheels C. It will be observed that by properly turning the windlass the height of the sill-pieces from the surface of the ground may be varied, as when the windlass is turned the supporting-wheels will be raised or lowered. This feature is desirable and essential in a cotton-harvester, as different conditions of the ground will produce plants of different heights, and in some instances the bolls of the first crop are located quite near the ground, while in other cases they are a considerable distance above, and by means of the devices hereinbefore shown and described the position of the harvester with respect to the surface of the ground can be varied.

The features of the invention hereinbefore described are applicable to cotton-harvesters whether provided with our special form of gathering mechanism or otherwise.

By reference to the drawings it will be observed that the cylinders which carry the picker-stems are not located opposite each other, but that one set of gathering mechanism is located on the forward portion of one side of the harvester, while the opposite gathering mechanism is in the rear thereof. This arrangement of the gathering mechanism is especially desirable, as the picker-stems contacting with the plants push the same to one side, and if said plants are not left free to move they will be more or less broken, while if they have a free space to move they will be practically uninjured and the growth thereof not retarded.

In harvesting cotton it is well known that there are three crops to be gathered from each plant, the first crop being taken from the ground upward for one-third the height of the plant, the second from the central portion of the plant, while the third is from the top downward. Therefore it is obvious that if the plants are injured in picking the first crop a loss will be entailed as to the second and following crop. From the foregoing the advantages of arranging the picking-cylinders rear of each other will be obvious and appreciated.

In Fig. 1 I have shown a view of the left-hand side of the harvester, and in this case the lower end of the perforated cylinder H is provided with a gear-wheel $h$, which meshes with a pinion $h'$, mounted on the shaft $h^2$, so as to turn said perforated cylinder in one direction, while the inner cylinder, I, having upper and lower bearings extends through the perforated cylinder to support the same and is turned in an opposite direction therefrom by means of a belt, which passes around a pulley formed on or attached to said inner cylinder, I, said belt being driven from a pulley $k$ on the shaft which carries the cleaners K.

The picker-stems H' taper outwardly and are covered with card-cloth, which may be made up in two or more pieces, the dents or teeth of said card-cloth inclining from the larger portion of the picker-stems to the outer ends thereof, so that when said picker-stems come in contact with the doffers, which may be covered with bristles, the cotton will be removed from the picker-stems and fall off the ends thereof. The picker-stems H' at their inner ends are provided with friction-collars $l$, beyond which is located a suitable washer, and a movable block or bearing $l'$, which is screw-threaded, encircles the picker-stem and engages with the screw-threaded perforations in the cylinder H, so that the friction-collars will engage with one of the edges of the circumferential rings formed on the inner cylinder, I. By this construction the picker-stems will rotate not only upon their axis, but also horizontally, and said picker-stems, contacting with the staple, will gather the cotton therefrom.

It will be particularly noted that the picker-stems H' have friction collars or disks, which engage by proper pressure with the rings or flanges formed on the inner cylinder, I, and this construction and means of revolving the picker-stems is especially desirable and advantageous, as one of said picker-stems may gather a large or superabundant quantity of the staple and clog, either by contact with the doffers or by the staple jamming and packing adjacent to the bearing. When this occurs, of course said picker-stem would be held against rotation, and if friction-gearing for driving the picker-stems were not provided this clogging or stoppage of a single picker-stem would stop the movement of the cylinder or shaft, and all the picker-stems would cease to operate or some part would have to break. Therefore I do not consider it practical to use cog-gearing or any form of gearing in which the parts mesh positively with each other.

As the picker-stems revolve horizontally they will contact with the doffers or cleaning-brushes, which are mounted on vertical shafts, and the cotton will be taken thereby from the picker-stems and deposited in the compartments adjacent to the endless belts, which will carry the cotton upwardly and deposit it in baskets or suitable receptacles carried beneath said endless belts, in one case the receiving-baskets being at the front portion of the frame while the opposite receiving-basket is at the rear end of the machine.

The doffers or cleaners which remove the cotton from the picker-stems may be of ordinary construction, no special construction being shown.

The picker-stems carried by the cylinder H are removable, as in practice it is only desirable to use a sufficient number of picker-stems to fill about one-third of the cylinder. This construction permits of the picker-stems being removed from the cylinder when desired, so that proper vertical adjustment can be made to suit the height of different crops.

The doffers or cleaners for the picker-stems consist of a series of fingers, which occupy a vertical space equal to about one-third of the height of the shaft upon which they are mounted, and they can be adjusted and secured upon said shaft in any suitable manner to suit the height of the different crops and be on a line with the picker-stems.

The main supporting and driving wheels C C have sprocket-wheels $o$ rigidly attached to the spokes thereof, and over said sprocket-wheels $o$ passes an endless chain $o'$, which also passes around the sprocket-wheel $o^2$, keyed upon the end of the shaft $h^2$. Over the inner end of the stub-axle is placed one end of a lever or bar $p$, the opposite end carrying a sprocket-wheel $o^3$ with which the belt engages. This arm $p$ is pivotally connected near its central portion to a bar $p'$, the upper end of which is attached to one of the outer vertical beams, and by means of this improved form of belt-tightener the chain will be kept tight irrespective of the position or height of the hub with its varying position in regard to the fixed sprocket-wheel $o^2$. Such parts of the frame may be inclosed by light framework or plates so as to protect the parts and also prevent the cotton when removed from the plant from being blown away. It will also be observed that the said frames A and A' are practically constructed alike, but reversed.

Having thus described our invention, we do not wish to be limited by the precise construction herein shown, but reserve the right to modify our invention within the spirit and scope of the claims.

We claim—

1. The combination in a cotton-harvester, of vertical cylinders carrying picker-stems having axial rotation, horizontally-revolving doffers for removing the cotton from the picker-stems, the picking mechanism being located on each side of the supporting-frame, one in rear of the other, and carrying-belts adapted to receive the cotton from the doffers and carry it to receptacles located at diagonally-opposite corners of the machine, substantially as set forth.

2. The combination in a cotton-harvester, of a suitable frame carrying vertical cylinders having horizontally-projecting picker-stems arranged upon the carrying-frame so as to be located one forward of the other on opposite sides of the machine, the picker-stems being removable and vertically adjustable upon their cylinders, and means substantially as shown for horizontally rotating the cylinders and axially rotating the picker-stems, substantially as shown, and for the purpose set forth.

3. In a cotton-harvester, the combination of a frame consisting of two side sections mounted on supporting-wheels and provided with vertical cylinders carrying picker-stems located upon the side frames, one of the cylinders being located upon the front portion of one of the frames and one on the rear portion of the other, cleaners mounted on vertical shafts so as to be adjustable thereon, and gearing for rotating the cleaners and picker-stems, substantially as set forth.

4. In a cotton-harvester, a carrying-frame mounted on supporting and driving wheels, a sprocket-wheel carried by said supporting-wheel, and endless belts engaging therewith and with fixed sprocket-wheels, a belt-tightener consisting of a bar journaled on a line with the hub of the wheel and carrying at the opposite end a sprocket-wheel, a bar pivoted to the frame and to the bar carrying the idle-sprocket, substantially as set forth.

5. In a cotton-harvester, the combination, of a cylinder carrying picker-stems, said stems being removable and adjustable upon said cylinders, a rotary set of cleaners mounted on a shaft and adapted to be secured in different vertical positions thereon and engage with the picker-stems, substantially as set forth.

In testimony whereof we affix our signatures in presence of two witnesses.

RUFUS J. ROBERSON.
CALVIN F. MOORE.

Witnesses:
W. C. BRUCE,
NATHANIEL MCINTYRE.